United States Patent
Lariviere

(10) Patent No.: US 8,360,448 B2
(45) Date of Patent: Jan. 29, 2013

(54) ANGULAR ADJUSTING SYSTEM FOR TORSION SUSPENSION AND TORSION SUSPENSION SO OBTAINED

(75) Inventor: Yves Lariviere, Saint-Constant (CA)

(73) Assignee: Système Nénuphar Inc., Saint-Constant (CA)

( * ) Notice: Subject to any disclaimer, the term of this patent is extended or adjusted under 35 U.S.C. 154(b) by 157 days.

(21) Appl. No.: 12/994,404

(22) Filed: Nov. 23, 2010

(65) Prior Publication Data

US 2011/0068550 A1    Mar. 24, 2011

Related U.S. Application Data

(60) Provisional application No. 61/055,700, filed on May 23, 2008.

(51) Int. Cl.
*B60G 9/02*  (2006.01)
*B60G 11/20* (2006.01)
*B60G 17/005* (2006.01)

(52) U.S. Cl. ......... 280/86.75; 280/124.169; 280/124.13; 280/6.157; 280/124.167; 301/127; 267/284; 267/280; 267/277; 267/276

(58) Field of Classification Search ............... 180/9.58, 180/9.6, 906; 280/489, 124.169, 124.166, 280/124.128, 124.13, 124.111, 124.102, 280/124.101, 86.75, 789, 788, 684, 6.157, 280/6.15, 124.167, FOR. 157, FOR. 174, 280/FOR. 178; 301/127, 2.5; 267/284, 281, 267/280, 279, 278, 277, 276, 273, 154, 285; 74/594.1; 248/587
See application file for complete search history.

(56) References Cited

U.S. PATENT DOCUMENTS

| | | | | | |
|---|---|---|---|---|---|
| 2,712,742 | A | * | 7/1955 | Neidhart | 464/83 |
| 2,861,796 | A | * | 11/1958 | Rohr | 267/257 |
| 2,998,981 | A | * | 9/1961 | Derr | 280/81.6 |
| 3,436,069 | A | * | 4/1969 | Henschen | 267/279 |
| 3,601,424 | A | * | 8/1971 | Badland | 280/124.13 |

(Continued)

FOREIGN PATENT DOCUMENTS

CH    191116    9/1937
DE    4129916 C1 * 1/1993

(Continued)

OTHER PUBLICATIONS

Supplementary European Search Report for related Application No. EP 06 80 4759.

(Continued)

*Primary Examiner* — Paul N Dickson
*Assistant Examiner* — Keith Frisby
(74) *Attorney, Agent, or Firm* — Baker & Hostetler LLP

(57) ABSTRACT

In a traditional hitched trailer there is no way to adjust the ride height of the trailer. Provided is an angular adjusting mechanism (13) for a suspension system (10) comprising a shaft (12) and a crank arm (20), the shaft (12) having a connecting end (14) connected to the crank arm (20), said angular adjusting mechanism (13) comprising a frusto-comcal shaped surface (16) provided on the connecting end (14) and pointing outwardly from said shaft (12), said surface (16) having an array of first cavities (18) arranged circumferentially, a frusto-comcal bore (22) proximate a first extremity of said crank arm (20), said bore (22) having an array of second cavities (24), said bore (22) being operative to mate with said surface (16) of said connecting end (14), and an interlocking element (30) partly positioned in one of said second cavities (24) and partly positioned in one of said first cavities (18) so as to lock said crank arm (20) at a predetermined angular position with respect to said shaft (12). Also, an improved torsion suspension system (10) including the above mentioned angular adjusting mechanism (13) is provided.

28 Claims, 10 Drawing Sheets

U.S. PATENT DOCUMENTS

| | | | | |
|---|---|---|---|---|
| 3,687,479 | A * | 8/1972 | Kober | 280/124.13 |
| 3,783,639 | A * | 1/1974 | Goodman et al. | 464/83 |
| 4,243,247 | A | 1/1981 | Kataoka | |
| 4,655,467 | A * | 4/1987 | Kitzmiller et al. | 280/444 |
| 5,161,814 | A * | 11/1992 | Walker | 280/414.5 |
| 5,163,701 | A * | 11/1992 | Cromley, Jr. | 280/124.13 |
| 5,203,375 | A | 4/1993 | Blanz | |
| 5,263,736 | A | 11/1993 | Stevens | |
| 5,411,286 | A * | 5/1995 | Pittman | 280/124.169 |
| 5,411,287 | A * | 5/1995 | Henschen | 280/124.169 |
| 5,788,265 | A | 8/1998 | McLaughlin | |
| 5,820,156 | A * | 10/1998 | VanDenberg | 280/676 |
| 6,299,259 | B1 * | 10/2001 | MacKarvich | 301/127 |
| 6,340,165 | B1 * | 1/2002 | Kelderman | 280/124.153 |
| 6,364,041 | B1 * | 4/2002 | Vangsgard | 180/24.12 |
| 6,447,073 | B1 * | 9/2002 | Goettker | 301/127 |
| 6,588,778 | B1 * | 7/2003 | McLaughlin | 280/124.13 |
| 7,261,287 | B2 * | 8/2007 | Gehret | 267/279 |
| 7,758,056 | B2 * | 7/2010 | VanDenberg et al. | 280/124.128 |
| 2003/0234505 | A1 * | 12/2003 | Few | 280/124.169 |
| 2005/0151339 | A1 * | 7/2005 | Carty | 280/124.169 |
| 2006/0022424 | A1 * | 2/2006 | Reynolds | 280/124.169 |
| 2007/0045993 | A1 * | 3/2007 | Jager | 280/656 |

FOREIGN PATENT DOCUMENTS

| | | |
|---|---|---|
| EP | 0827849 A2 | 3/1998 |
| FR | 967306 | 10/1950 |
| FR | 1019504 | 1/1953 |
| JP | 60124512 A * | 7/1985 |
| JP | 10157429 A * | 6/1998 |
| WO | 00/09356 A1 | 2/2000 |
| WO | 2007/056868 A1 | 5/2007 |

OTHER PUBLICATIONS

International Preliminary Report on Patentability for Application No. PCT/CA2009/000733 (Nov. 23, 2010).

* cited by examiner

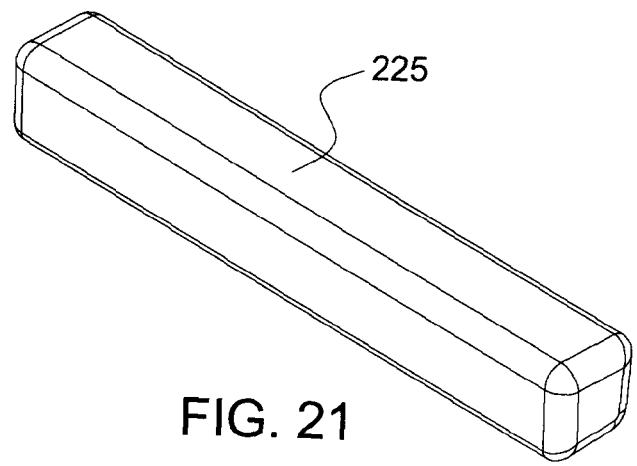
FIG. 21
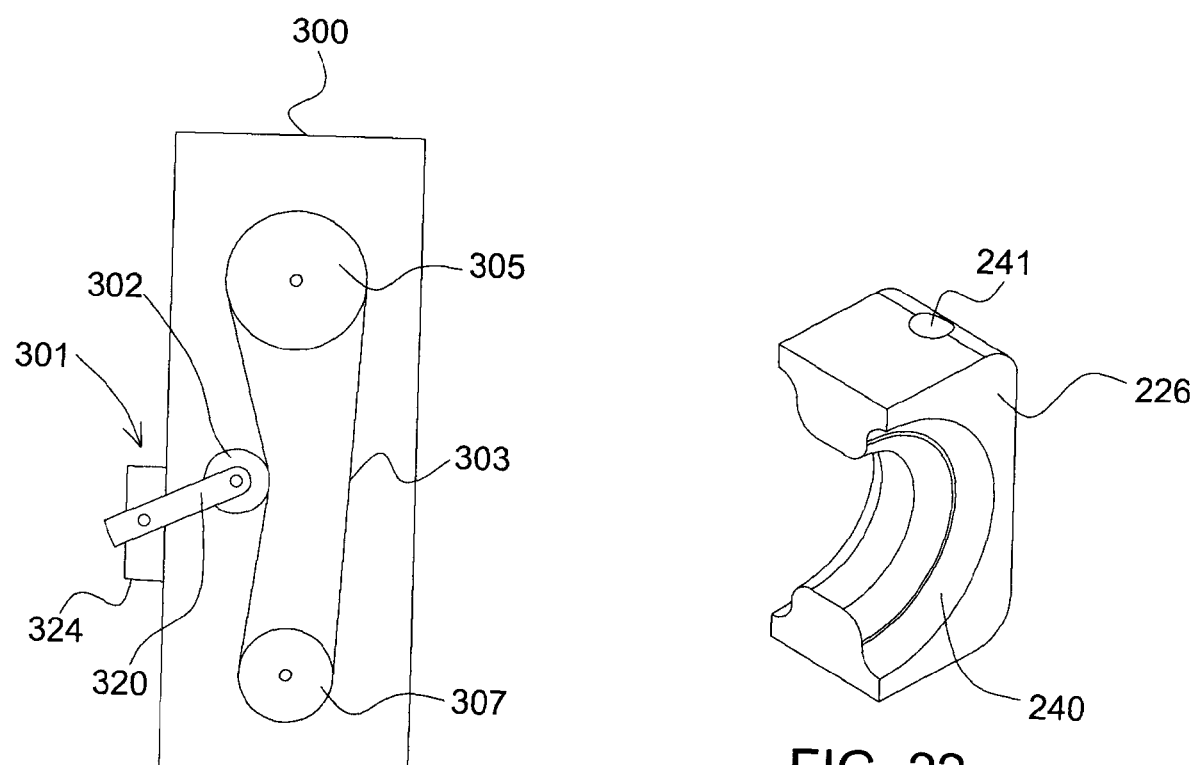
FIG. 22
FIG. 23

ANGULAR ADJUSTING SYSTEM FOR TORSION SUSPENSION AND TORSION SUSPENSION SO OBTAINED

CROSS-REFERENCE TO RELATED APPLICATION

This patent application is a National Stage of International Patent Application No. PCT/CA2009/000733, filed on May 25, 2009, which claims priority to U.S. Provisional Patent Application No. 61/055,700, filed on May 23, 2008, the contents of which are hereby incorporated herein by reference in their entirety.

FIELD OF THE INVENTION

The present invention generally relates to the field of hitched trailers for vehicles or various devices involving the use of a torsion suspension such as tensioning devices, motor bases, oscillating mounting, etc. More specifically, the invention relates to a torsion suspension for such trailers having an angular adjusting mechanism. The present invention also relates to an angular adjusting system for a torsion suspension.

BACKGROUND OF THE INVENTION

Torsion axles represent a way to provide some independent suspension to the wheels of vehicles. Torsion axles and torsion suspensions are commonly used with vehicles such as hitched trailers. Also, torsion axles and torsion suspensions can be used with various devices involving the use of a torsion suspension such as tensioning devices, motor bases, oscillating mounting, etc.

Such trailers are used in a wide variety of applications like hauling a recreational vehicle, transporting dirt or branches, moving furniture, etc. However, sometimes, the trailer is too high for the application such that it is difficult to place the object to be loaded on the trailer. Some other times though, the trailer is too low for the application, like when going off-road.

There is therefore a need to provide a way to either lower or raise the height of the trailer.

SUMMARY OF THE INVENTION

It is an object of the present invention to provide a torsion suspension system that overcomes or mitigates one or more disadvantages of known torsion suspension systems, or at least provides a useful alternative. Also, even though the following description is directed to a vehicle suspension system, it may be applied to various devices involving the use of a torsion suspension such as tensioning devices, motor bases, oscillating mounting, etc.

The invention provides the advantages of facilitating the adjustment of the height of a trailer by the angular adjustment of the suspension crank arms with respect to a shaft.

The invention also provides the advantages of facilitating the replacement of the crank arms from the shaft.

The invention also provide with the further preferred advantage of having a plane of symmetry allowing to define an universal crank arm either side of a suspension system. This gives an economical advantage of reducing production and inventory costs.

The invention is particularly and non limitatively useful with a torsion system for torsion axle/suspension as defined in Applicant's US patent application which is a national phase originating from the Applicant's International Patent Application PCT/CA2006/001901 the content of which is hereby incorporated by reference in its entirety.

More particularly, in this International Patent Application PCT/CA2006/001901, the Applicant describes a torsion system comprising: a housing adapted to be secured to a structural portion of a vehicle; a shaft having a core portion accommodated in the housing and defining at least one concavity in the core portion, the shaft having a connector end connected to a crank arm, the connector end protruding out of the housing; and an elastomeric member received in the concavity of the shaft, the elastomeric member having a geometry so as to at least partially fill the concavity and contact an inner surface of the housing; whereby a rotation of the crank arm results in a deformation of the elastomeric member. One of the advantages of this torsion system relates to the fact that the core portion do not have translational movements allowing the elastomeric member to be deformed only by rotational movement of the shaft.

Further in this International Patent Application PCT/CA2006/001901, the Applicant describes a method for inserting elastomeric members in a torsion system, comprising the steps of: positioning at least one unused elastomeric member on a shaft of a torsion system; manually inserting the shaft and the at least one unused elastomeric member in a housing of the torsion system; and locking support blocks to maintain the shaft and elastomeric member captive in the housing of the torsion system.

According to a first embodiment, the present invention relates to an angular adjusting mechanism for a suspension system comprising a shaft and a crank arm, the shaft having a connecting end connected to the crank arm, said angular adjusting mechanism comprising:
   a frusto-conical shaped surface provided on the connecting end and pointing outwardly from said shaft, said surface having an array of first cavities arranged circumferentially;
   a frusto-conical bore proximate a first extremity of said crank arm, said bore having an array of second cavities, said bore being operative to mate with said surface of said connecting end; and
   an interlocking element partly positioned in one of said second cavities and partly positioned in one of said first cavities so as to lock said crank arm at a predetermined angular position with respect to said shaft.

According to a second embodiment, the invention relates to a torsion suspension system comprising:
   a shaft having two opposed connecting ends, each one of said connecting ends having a frusto-conical shaped interface surface pointing outwardly from said shaft, said interface surface having an array of first cavities arranged circumferentially;
   a pair of angular adjusting mechanisms, each one of said pair of an angular adjusting mechanisms being located at a respective connecting ends, each said angular adjusting mechanism having:
      a crank arm, said crank arm having a frusto-conical bore proximate a first extremity of said crank arm, said bore having a second cavity, said bore being operative to mate with said interface surface of said connecting end; and
      an interlocking element, said interlocking element being partly positioned in said second cavity and partly positioned in one cavity of said array of said first cavities so as to lock said crank arm at a predetermined angular position with respect to said shaft. As a non limitative example, this second embodiment can be preferably useful when used as part of a tensioning device for a belt or a strap.

According to a third embodiment, the invention relates to a torsion suspension system comprising:
   a shaft having two opposed connecting ends;
   two crank arms operatively connected to a different one of said connecting ends;
      an angular adjusting mechanism at each of said connecting ends, said angular adjusting mechanism being operative to angularly adjusting an angle of each of said two crank arms with respect to said shaft. As a non limitative example, this third embodiment can be preferably useful when used as part of a tensioning device for a belt or a strap.

According to a fourth embodiment, the invention relates to a torsion system comprising:
   a housing adapted to be secured to a structural portion of a vehicle;
   a shaft having a core portion accommodated in the housing and defining at least one concavity in the core portion, the shaft having a connecting end connected to crank arm, the connecting end protruding out of the housing;
   at least one elastomeric member having a geometry so as to at least partially fill the concavity and contact an inner surface of the housing, the rotation of the crank arm resulting in a deformation of the elastomeric member; and
   an angular adjusting mechanism comprising:
      a frusto-conical shaped interface surface provided on the connector and pointing outwardly from said shaft, said interface surface having an array of first cavities arranged circumferentially;
      a frusto-conical bore proximate a first extremity of said crank arm, said bore having an array of second cavities, said bore being operative to mate with said interface surface of said connecting end; and
      an interlocking element partly positioned in one of said second cavities and partly positioned in one of said first cavities so as to lock said crank arm at a predetermined angular position with respect to said shaft. According to an alternative embodiment, an angular adjusting mechanism may be provided at both ends of the shaft.

According to a fifth embodiment of the invention, the connecting ends of any of the above mentioned embodiments may further comprise a screw for attaching said crank arm to said connecting end. More preferably, this screw is adapted to cooperate with a corresponding threaded bore provided in a corresponding connecting end, to press the crank arm against the connecting end and maintain the interlocking element in said first and second cavities. Optionally and not imitatively, a washer may be positioned between the head of the screw and the crank arm.

According to a sixth embodiment of the invention, the crank arm of any of the above mentioned embodiments may further comprise an axle proximate a second extremity of said crank arm, said axle being parallel to said shaft. Such an axle can be mounted to the crank arm according to any conventional techniques well known to a person skilled in the art.

According to a seventh embodiment of the invention, the interlocking element of any of the above mentioned embodiments may be tightly enclosed within a volume defined by one cavity of the first array of cavities and the cavity of the second cavities. Optionally, an array of several second cavities may be provided, allowing the user to select the second cavity he needs.

According to an eighth embodiment of the invention, the core portion may have a cross-shaped section with four of said concavity. More preferably, each of said concavity is defined by adjacent walls that form an obtuse angle to each other. An example of such an obtuse angle may be +5 degree with respect to a normal angle between said adjacent walls. When the core portion or the shaft comprising the core portion, is obtained by moulding techniques, such obtuse angles allows an easy removal from a mould. Advantageously, the core portion can be made of any appropriate material well known to a person skilled in the art, especially of aluminum, iron, iron alloys, etc. Steel is particularly preferred. Also, according to an optional and particularly preferred aspect, each intersection of adjacent walls may be rounded to improved mechanical characteristics of the core portion.

According to a ninth embodiment of the invention, the elastomeric members for each of the four concavities are an elongated member of generally trapezoidal cross-section. Obtuse angles of this trapezoidal cross-section are selected in order to fit with corresponding adjacent walls of a corresponding concavity of the core portion. Also, according to an optional and particularly preferred aspect, each intersection of adjacent walls of the member may be rounded in order to fit with rounded portions of the corresponding concavity. More preferably, these elastomeric members may be obtained by molding or extrusion according to techniques well known to persons skilled in the art. Also, chemical formulations of these elastomeric members may be similar to those already known in the art.

According to a tenth embodiment of the invention, the shaft may have a pair of supported surfaces at opposed ends of the core portion. More preferably, each of these supported surfaces is adjacent to flanges and forms a groove, the intersection of each of these supported surfaces with the flanges being rounded.

According to an eleventh embodiment of the invention, the torsion system may further comprise support blocks operatively supporting the supported surfaces in the housing such that the shaft is rotatable about its longitudinal axis. More particularly, the support blocks are paired at each said supported surface, each support block having an opening that is shaped to corresponds with a corresponding portion of a groove defines by the supported surfaces and flanges provided on said shaft.

According to twelfth embodiment of the invention, at least one of the pairs of support blocks is secured to the housing, and the support blocks maintain the shaft captive within the housing. Each of these support blocks cooperates with supported surfaces and flanges to prevent translation movements of the shaft with respect to the housing.

According to a thirteenth embodiment, the invention also relates to a method for inserting elastomeric members in a torsion system, said method comprising the steps of: positioning at least one unused elastomeric member on a shaft of a torsion system; manually inserting the shaft and the at least one unused elastomeric member in a housing of the torsion system; and locking support blocks to maintain the shaft and elastomeric member captive in the housing of the torsion system.

According to a fourteenth embodiment of the invention, the insertion of elastomeric members in the torsion system is preceded by the steps of: releasing the support blocks from maintaining the shaft and used elastomeric members captive within the housing of the torsion system; manually removing the shaft and the used elastomeric members from the housing; and separating the shaft from at least one of the used elastomeric members.

According to a fifteenth embodiment of the invention, the steps of removing and inserting elastomeric members involved a used elastomeric member and an unused elastomeric member of different hardnesses. More particularly, the step of manually locking the shaft also involves positioning the support blocks on the shaft, and much more preferably, the step of locking the support blocks involves passing at least one fastener transversely through at least a portion of the housing and at least a portion of at least one of the support blocks.

According to a sixteenth embodiment of the invention, the step of positioning at least one unused elastomeric member involves inserting the elastomeric member in a concavity of the shaft of the torsion system.

According to another embodiment, the invention relates to a trailer for being hauled by a vehicle, preferably a trailer, comprising:
 a body; and
 a torsion suspension system as defined in any one of the above mentioned embodiments.

According to another embodiment, the invention relates to a strap of belt assembly, comprising a strap or a belt mounted on supporting rotationary members, and a tensioning device for tensioning said strap or belt on said rotationary members, said tensioning device comprising a torsion suspension system as defined hereinabove.

According to another embodiment, the invention relates to a use of a torsion suspension system as defined hereinabove, in a suspension of a vehicle.

According to another embodiment, the invention relates to a use of a torsion suspension system as defined hereinabove,
 in tensioning device for a mobile belt or strap, or
 in a motor base or
 in an oscillating mounting.

BRIEF DESCRIPTION OF DRAWINGS

These and other features of the present invention will become more apparent from the following description in which reference is made to the appended drawings wherein:

FIG. 21 is a perspective view of the elastomeric member of FIG. 17.

FIG. 22 is a perceptive view of an improved block designed to fit with a groove of the shaft of FIG. 13.

FIG. 23 is a schematic view of an alternative use of an improved torsion system according to the invention.

DETAILED DESCRIPTION OF THE INVENTION

The present invention relates to a design of torsion suspension used on trailers and other similar vehicles.

Figure 1:
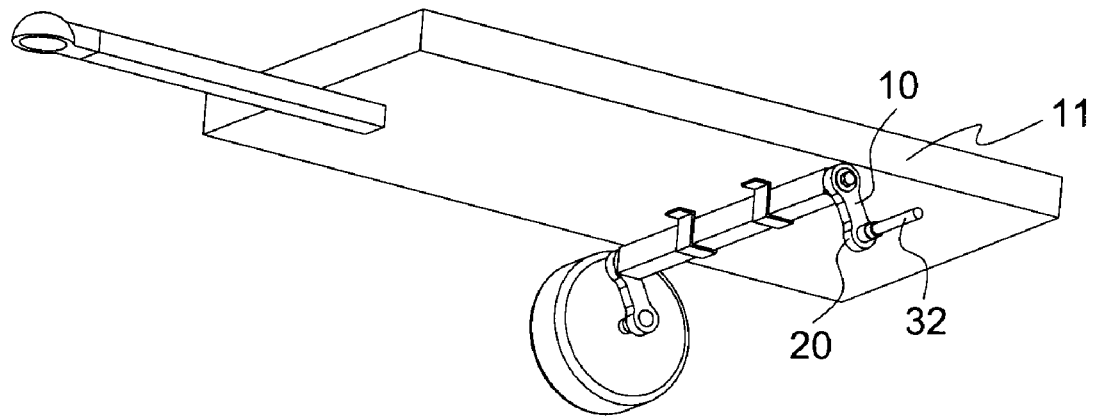
FIG. 1 is an isometric view of a trailer on which a torsion suspension system in accordance with an embodiment of the present invention is mounted.

FIG. 1 generally depicts a torsion suspension system 10 mounted on a trailer 11.

Figure 2:
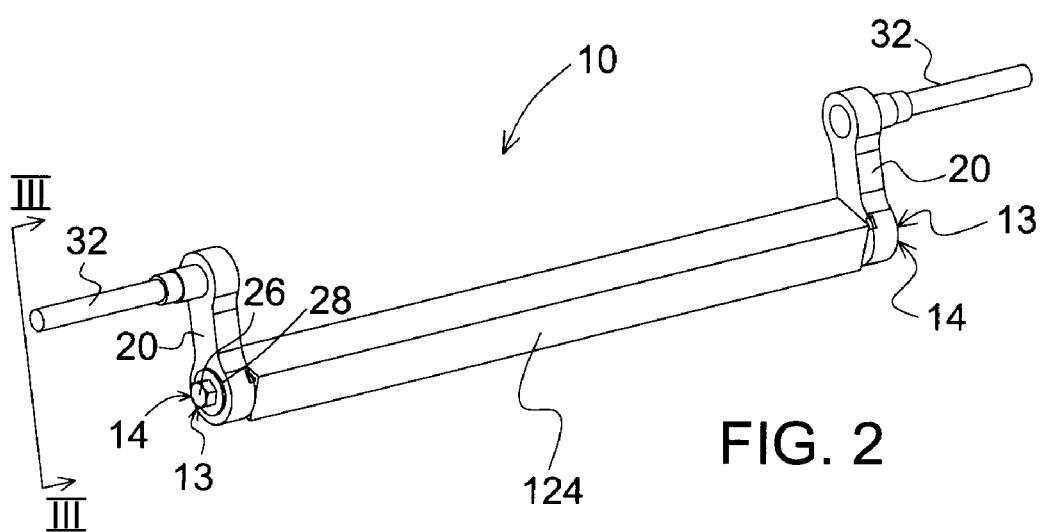
FIG. 2 is an isometric view the torsion suspension system of FIG. 1.
Figure 3:
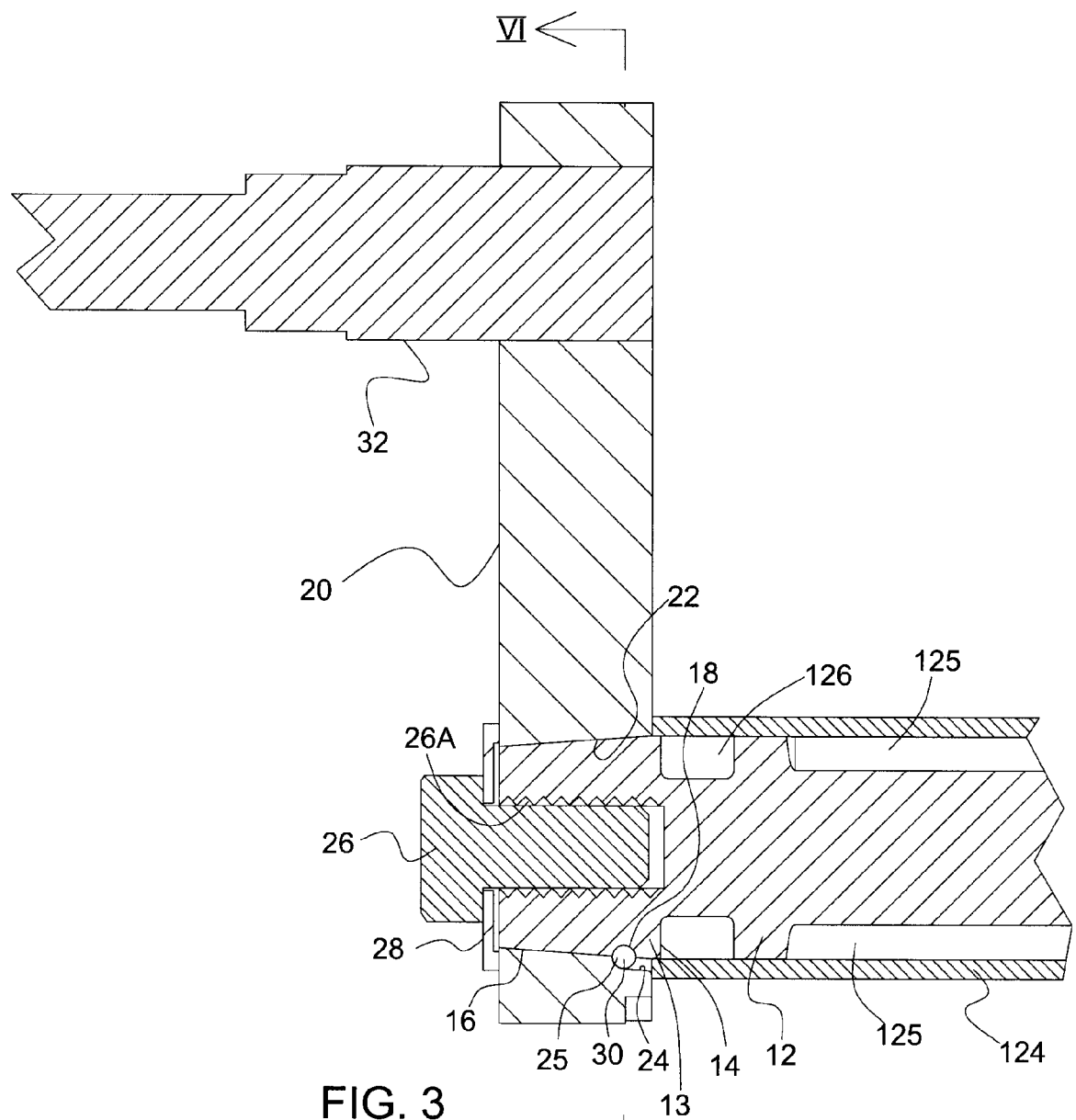
FIG. 3 is a cut away plan view along line III-III, of a portion of a shaft of the torsion suspension system of FIG. 1 with a bore cavity provided in the crank arm for the interlocking element positioned in first alternative position.
Figure 4A:
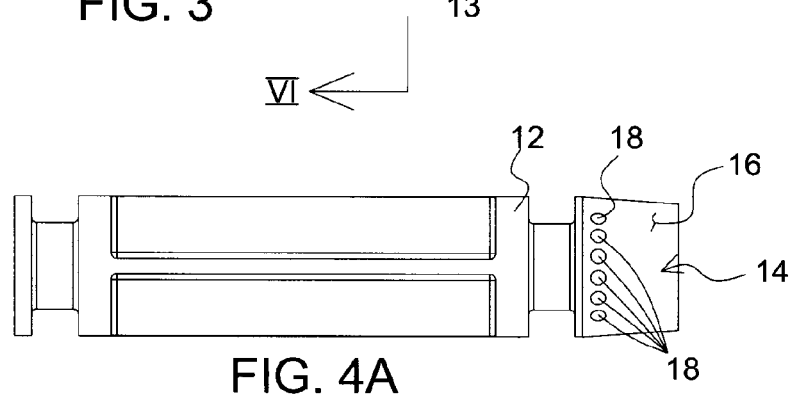
FIGS. 4A, 4B and 4C are respectively a plan view, a end view and a perspective view of a portion of a variant of the angulary adjusting system shown in FIG. 3.
Figure 4B:
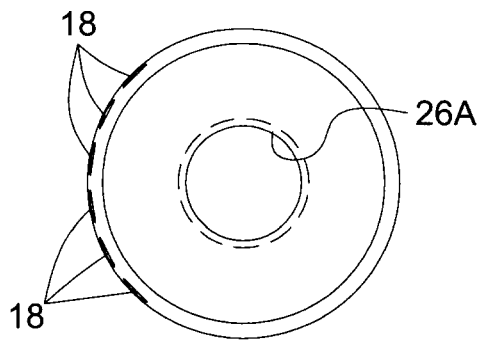
Figure 4C:
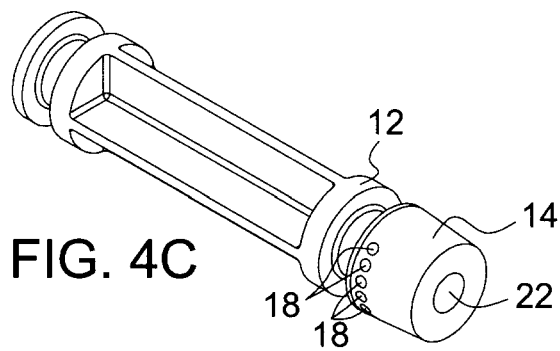
Figure 6:
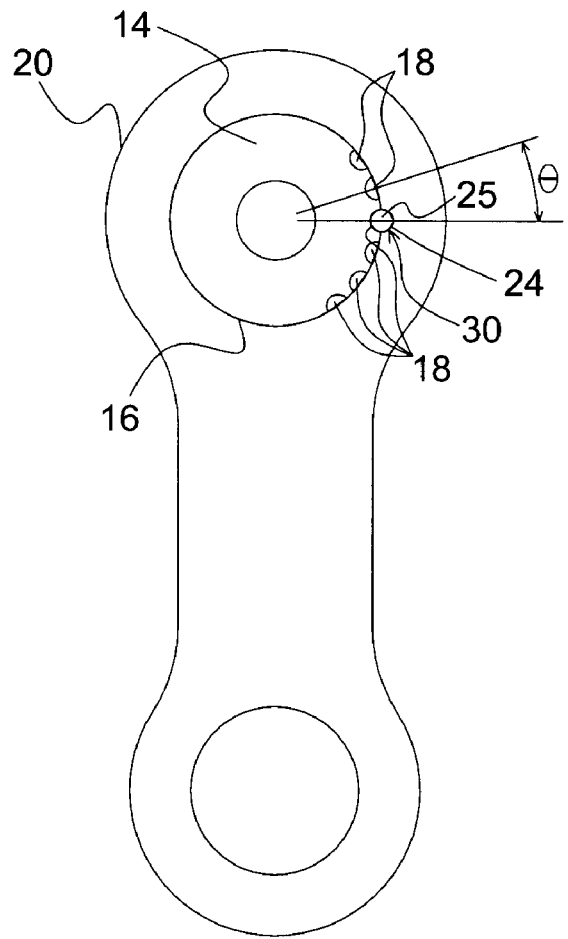
FIG. 6 is a cut away side view according to line VI-VI of the angular adjusting mechanism of the torsion suspension system of FIG. 3 with a bore cavity provided in the crank arm for the interlocking element, and positioned in second alternative position.

FIG. 2 depicts in more details the torsion suspension system 10. The torsion suspension system 10 comprises a shaft 12 having two opposed connecting ends 14. Each one of the connecting ends 14 is equipped with an angular adjusting mechanism 13. For example, as illustrated in FIG. 3, the angular adjusting mechanism 13 may have a frusto-conical shaped interface surface 16 that points outwardly from the shaft 12. This is best shown in FIGS. 3 and 6, now concurrently referred to. The angular adjusting mechanism 13 may be carried partly by the shaft 12 and partly by a crank arm 20. The interface surface 16 has an array of shaft cavities 18 arranged circumferentially. The shaft 12 may be optionally and not limitatively mounted within a housing 124 and provided with elastomeric members 125 and support blocks 126 according to Applicant's international application no. PCT/CA2006/001901.

The crank arm 20 is operatively connected to each one of the connecting ends 14. Each crank arm 20 has a frusto-conical bore 22 at one extremity of the crank arm 20 as part of the angular adjusting mechanism 13. This is best shown in FIG. 5, now concurrently referred to. The bore 22 has a bore cavity 24. Both the interface surface 16 of the connecting end 14 and the bore 22 are designed to mate together. A screw 26 and a washer 28 may be used to attach the crank arm 20 to the connecting end 14. In such case a threaded bore 26A is provided. Other similar fastening systems may also be used.

Each connecting end 14 of the torsion suspension system 10 is further provided with a interlocking element 30. The interlocking element 30 is partly positioned in the bore cavity 24 and partly positioned in one of the shaft cavities 18. By doing so, the interlocking element 30 locks the crank arm 20 at a predetermined angular position with respect to the shaft 12. FIG. 6 depicts the angular position of the crank arm 20 with respect to the shaft 12.

Advantageously, the crank arm 20 may further comprises an axle 32 proximate a second extremity of the crank arm 20. The axle 32 is positioned parallely to the shaft 12 so that a wheel mounted on it would move up and down by rotating the shaft 12.

In FIGS. 4A, 4B, 4C, 5A and 5B there is illustrated a particularly preferred variant of the angulary adjusting mechanism where cavities on the frusto-conical connecting end represent portions of a sphere, the interlocking element 30 is a sphere 25 (such as for example and not limitatively a bearing ball) and the bore cavity 24 is shaped to receive said sphere 25. The distance between two neighboring cavities 18 corresponds to a given angular position θ. The selection of a given cavity 18 by the sphere 25 determines the angulary position of the crank arm 20 with respect to the vehicle. The shaft 12, the crank arm 20, the sphere 25, axle 32, the interlocking element 30, the screw 26 and the washer 28 can be made of any appropriate material, preferably of a metal such as aluminum, iron or iron alloys, more preferably of steel.

Figure 5A:
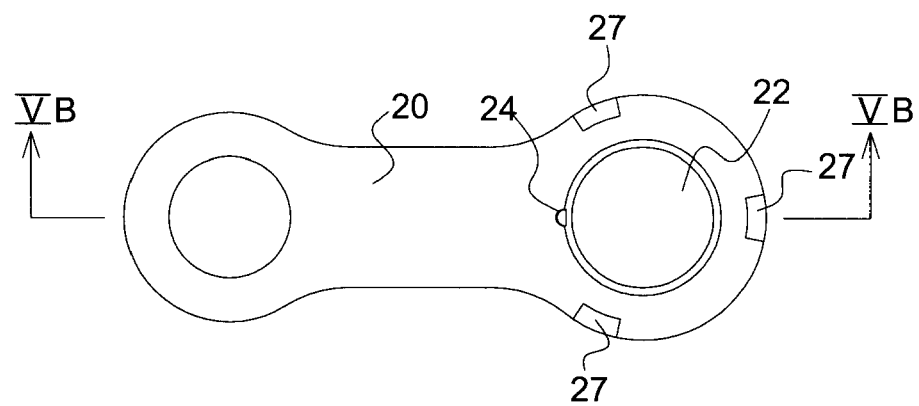
FIGS. 5A and 5B are respectively a plan view and a cut away plan view according to line VB-VB of a crank arm of the torsion suspension system of FIG. 3.
Figure 5B:
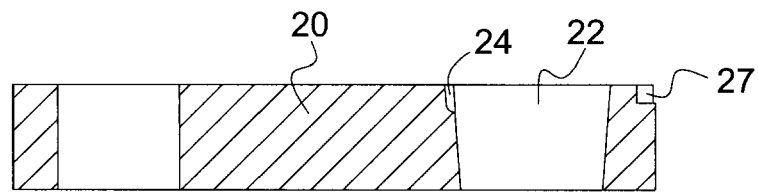

Also, FIGS. 5A and 5B further illustrate peripheric recesses 27 allowing to be engaged by a conventional puller in order to help to remove the crank arm 20 from the shaft 12. To mount a crank arm 20 on the shaft 12, one only have to align the cavity 24 with a proper cavity 18 in which an interlocking element 30 (e.g. sphere 25) is positioned, and then to screw the screw 26 into the threaded bore 26A to press the washer 28 against the crank arm 20 and the bore 22 against the frusto-conical connecting end. To remove the crank arm 20 from the shaft 12, the screw 26 is unscrewed, the washer is removed and a conventional puller may be optionally used to removed the crank arm from the frusto-conical connecting end. When a conventional puller is used, it may engage recessed 27 to allow a better anchoring of the puller on the crank arm 20.

Figure 7A:
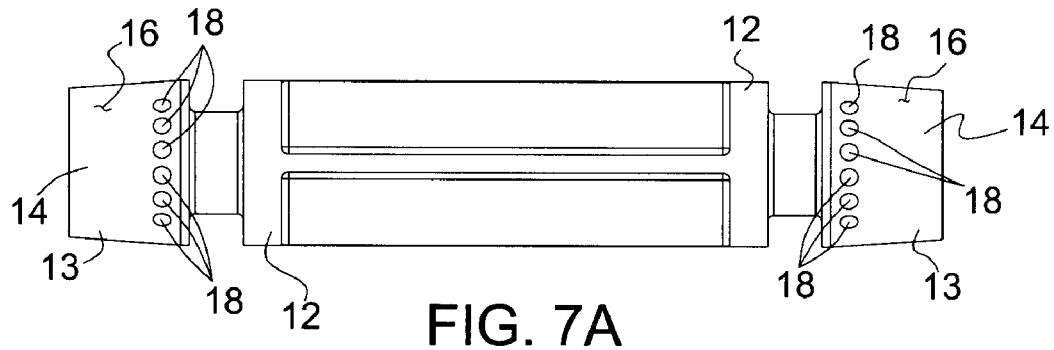
FIGS. 7A, and 7B are respectively a plan view and an end view of a variant of the angulary adjusting system shown in FIGS. 4A to 4C.
Figure 7B:
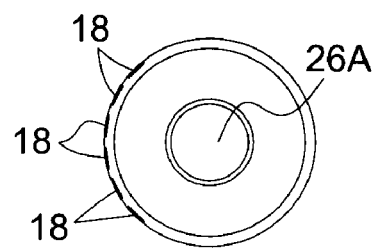

Also, FIGS. 7A and 7B further illustrate a variation of the shaft 12 where angulary adjusting mechanisms may be provided at both ends of the shaft.

It will be apparent to a person skilled in the art that various modifications could be brought to the present invention. For example, the interface surface 16 could be equipped with only one shaft cavity 18 while the bore 22 could be equipped with a plurality of bore cavities 24. Optionally and not imitatively, the bone 22 may comprise an array of cavities 24. According to a particularly preferred embodiment, the shaft 12 is an hollow housing 24 in which the shaft 12 is as defined in Applicant's International Patent Application no. PCT/CA2006/001901.

FIGS. 8 to 12 illustrate a prior version of a torsion system described in Applicant's International Patent Application no. PCT/CA2006/001901. More particularly, referring to those drawings, and more particularly to FIG. 8, a torsion system in accordance with an embodiment is generally shown at 120.

The torsion system 120 is shown having a crank arm 121. In the illustrated embodiment, the crank arm 121 is made of a tube of rectangular section, but may be a solid piece, a single machined or cast piece, etc. The crank arm 121 has a connector hole 122 at a free end so as to support a hub, or any other rod-like member compatible with the torsion system 120. Alternatively, the crank arm 121 may incorporate a shaft, hub, or fastener at its free end.

A shaft 123 is connected at the opposed end of the crank arm 121. The shaft 123 is enclosed in housing 124. Elastomeric members 125 are positioned between the shaft 123 and the interior of the housing 124. Support blocks 126 are provided at opposed ends of the shaft 123. Some of the support blocks 126 are used in combination with fasteners, such as bolt 128 and nut 129 passing through the housing 124 at holes 127 to maintain the shaft 123 captive within the housing 124. As other alternatives, a screw (not shown) can be bolted directly into the support block 126, with or without tapping in the holes 127 of the housing 124 or in the support blocks 126. Moreover, the support blocks can be end caps positioned at opposed ends of the housing or the like.

Figure 9:
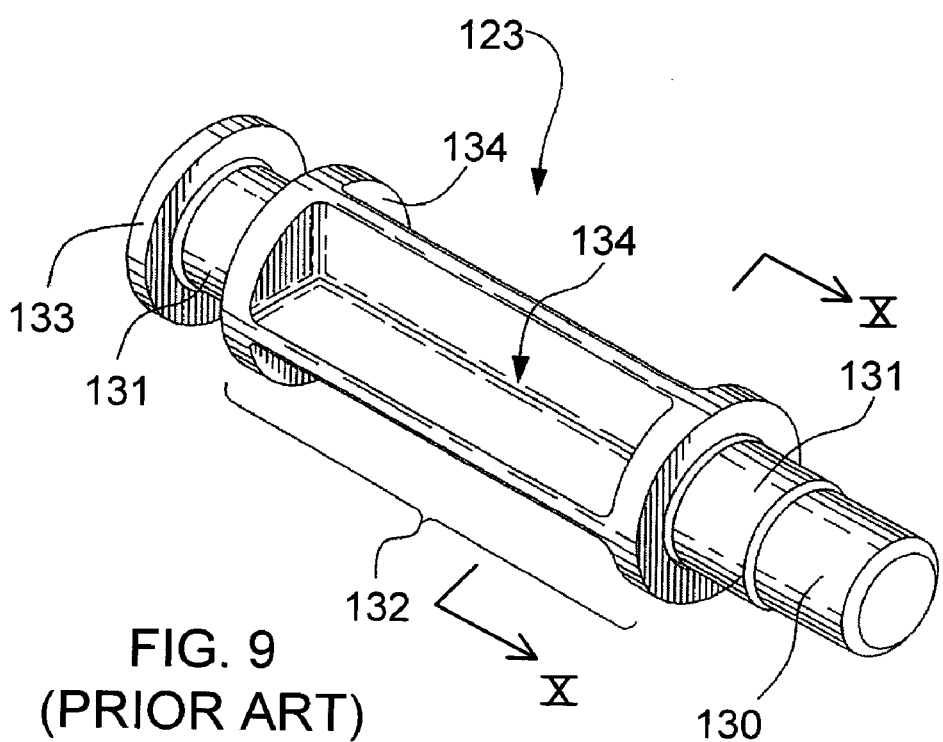
FIG. 9 is a perspective view of Applicant's shaft that is part of the prior art.

The housing 124 is the interface of the torsion system 120 with the structure of the vehicle. Although not shown, it is considered to provide the housing 124 with connection flanges on its outer surface, such that the torsion system 120 may be connected to the structure of the vehicle using bolts or like fasteners. Moreover, the housing 124 is illustrated as having a square cross-section, but other cross-sectional shapes are considered. Referring to FIG. 9, the shaft 123 is shown individually. The shaft 123 has a connector end 130, by which it is connected to the crank arm 121. Supported surfaces 131 are separated by a core portion 132. A flange 133 is provided at the end of the shaft 123 away from the connector end 130. In an embodiment, the crank arm 121 and the shaft 123 form an integral piece.

Figure 10:
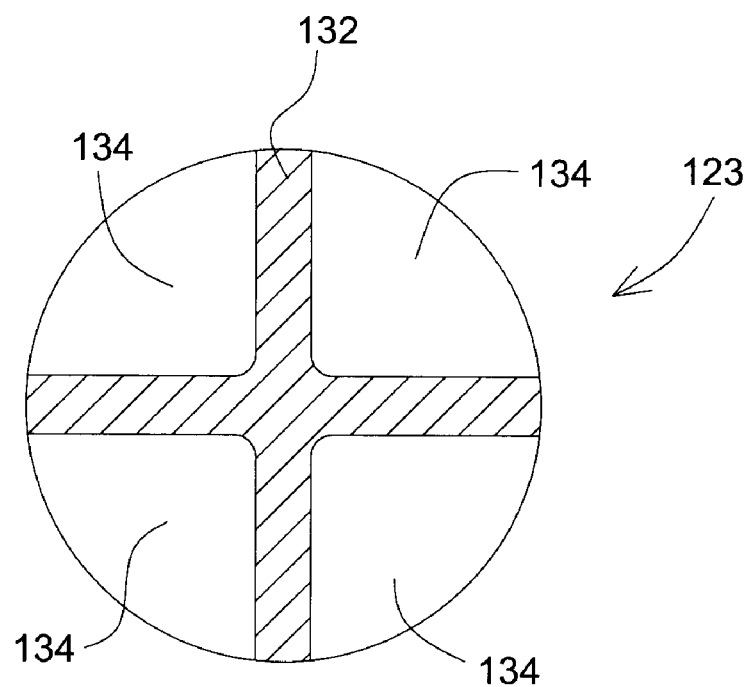
FIG. 10 is a cross sectional view of the shaft of FIG. 9 along line X-X.
Figure 11:
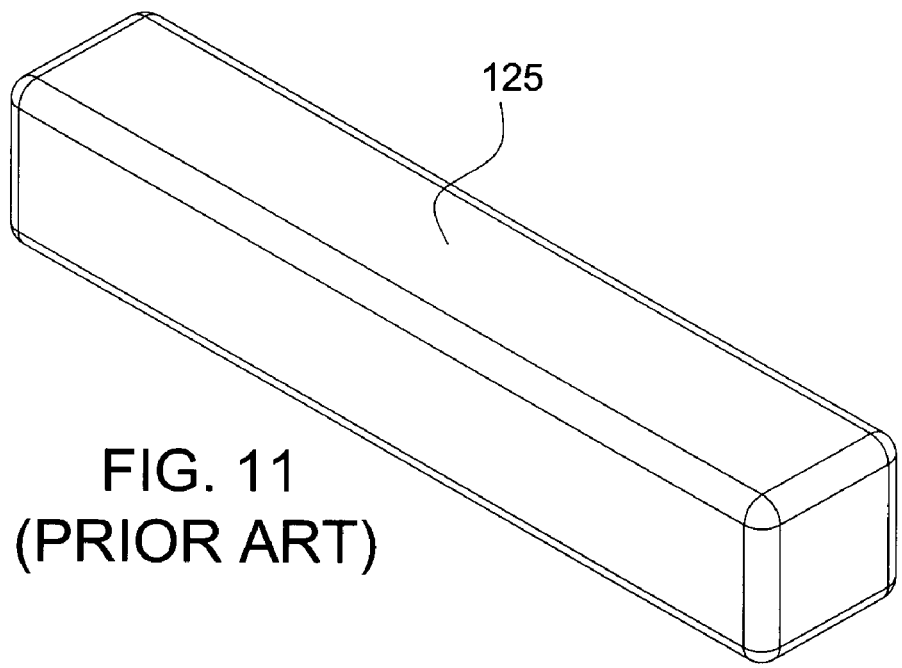
FIG. 11 is a perspective view of Applicant's elastomer member that is part of the prior art.

The core portion 132 is the portion of the shaft 123 that will be interfaced with the elastomeric members 125 (FIG. 11). In the embodiment of FIGS. 9 and 10, the core portion 132 is a circular rod in which concavities 134 have been defined. The concavities 134 are receptacles in which a portion of the elastomeric members 125 are received.

Referring to FIG. 10, the core portion 132 is shown having four of the concavities 134, such that the core portion 132 defines a cross-shaped section. Although the illustrated embodiment of the core portion 132 is shown with four concavities 134, it is considered to provide any suitable number of concavities, starting with a single concavity. The number of elastomeric members 125 used will have a direct effect on the shock absorption level of the torsion system 120.

Figure 8:
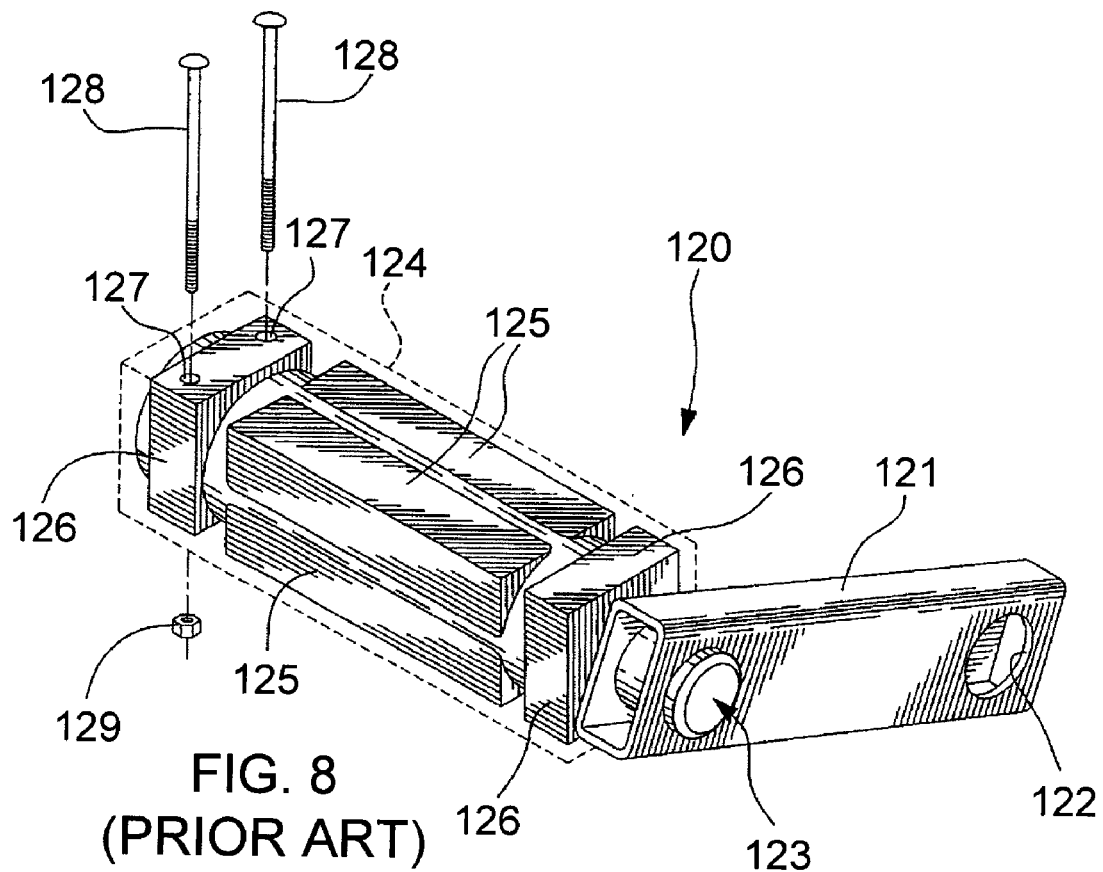
FIG. 8 is a perspective view of Applicant's torsion system that is part of the prior art.

Referring concurrently to FIGS. 8 and 11, one of the elastomeric members 125 is shown. The geometry of the elastomeric member 125 is defined so that the elastomeric member 125 matches the shape of one of the concavities 134. Moreover, when accommodated in the concavity 134, the elastomeric member 125 has two of its walls coplanar with the inner walls of the housing 124. Accordingly, as shown in FIG. 8, a rotation of the shaft 123 about its longitudinal axis is opposed by the elastomeric member 125. The elastomeric members 125 must be deformed for the shaft 123 to rotate about its longitudinal axis. The elastomeric material used is any suitable elastomer, such as a polymer, a rubber or the like. In one embodiment, the elastomer is urethane at a durometer hardness of 70, but a wide range of hardnesses are considered. It is considered to increase the length and/or diameter of the torsion system 120, so as to increase the load capacity of the torsion system. In an embodiment, the elastomeric members 125 are extruded. The cross-shaped section of the core portion 132 as embodied in FIG. 8 is advantageous in that all elastomeric members 125 have the same cross-section. Therefore, all elastomeric members 125 may be obtained by any appropriate processes such as for example extrusion or moulding. Preferably said elastomeric members 125 are extruded from a single extrusion.

It is pointed out that the configuration of the shaft 123/elastomeric members 125 enables the torsion system 120 to be mounted without the shaft 123 being pre-stressed. Therefore, as opposed to the prior-art torsion axles and torsion suspensions, neither hydraulic presses nor freezing equipment are required to assemble the torsion system 120 of FIG. 8.

Figure 12:
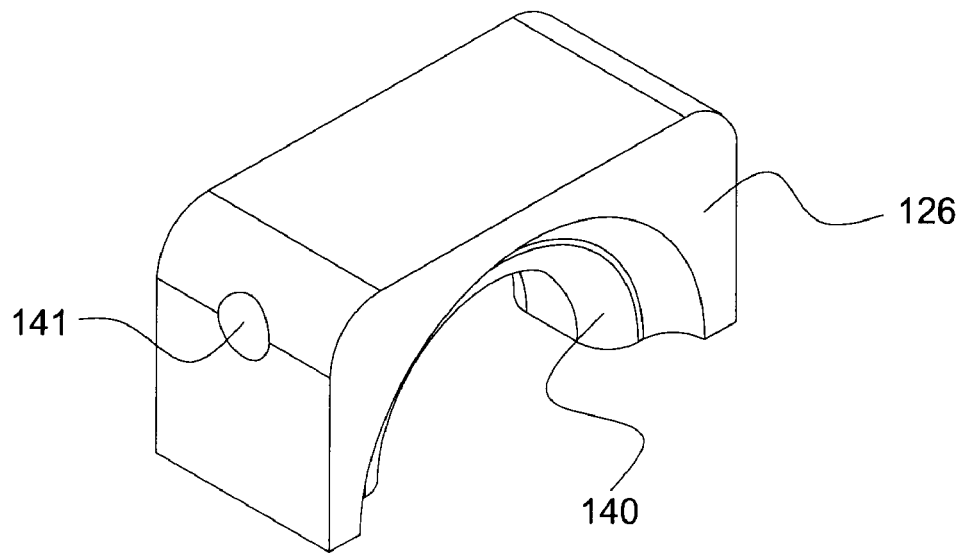
FIG. 12 is a perspective view of Applicant's block that is part of the prior art.
Figure 13:
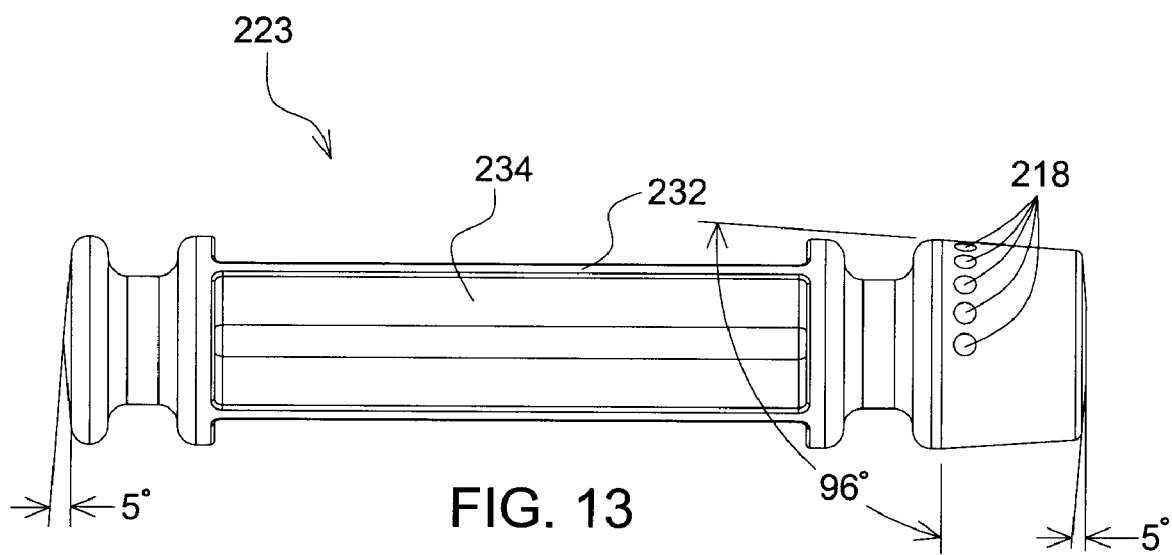
FIG. 13 is a plan view of a variant of the shaft of the angulary adjusting system shown in FIGS. 4A to 4C.
Figure 14:
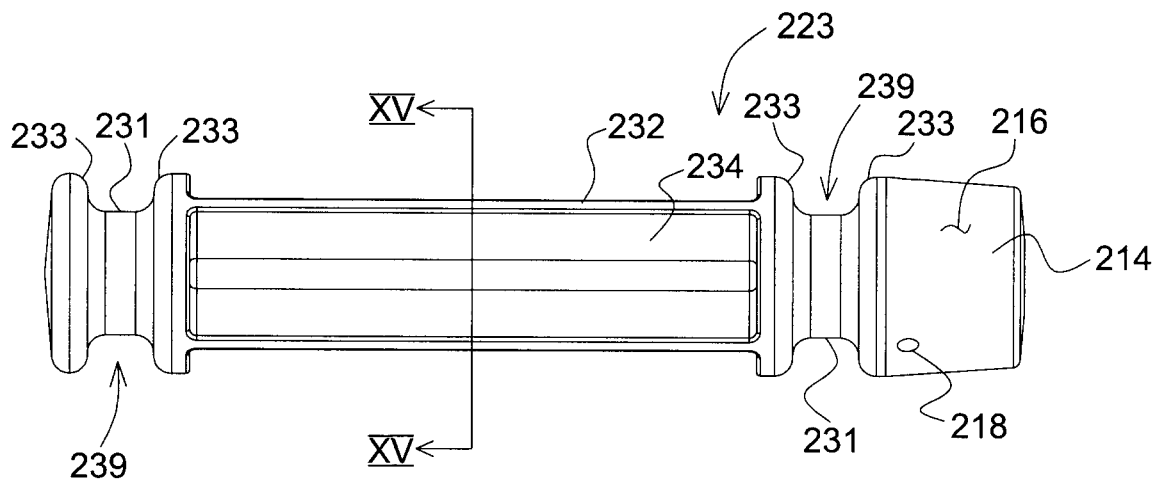
FIG. 14 is a side view of the angulary adjusting system shown in FIG. 13.
Figure 15:
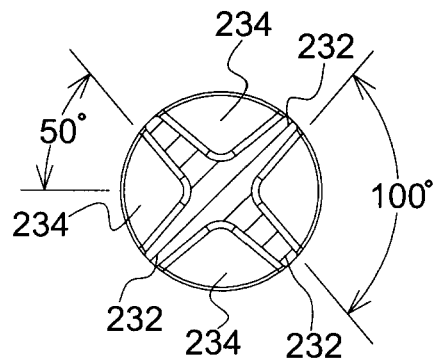
FIG. 15 is a cross-sectional view of the angulary adjusting system shown in FIG. 13.
Figure 16:
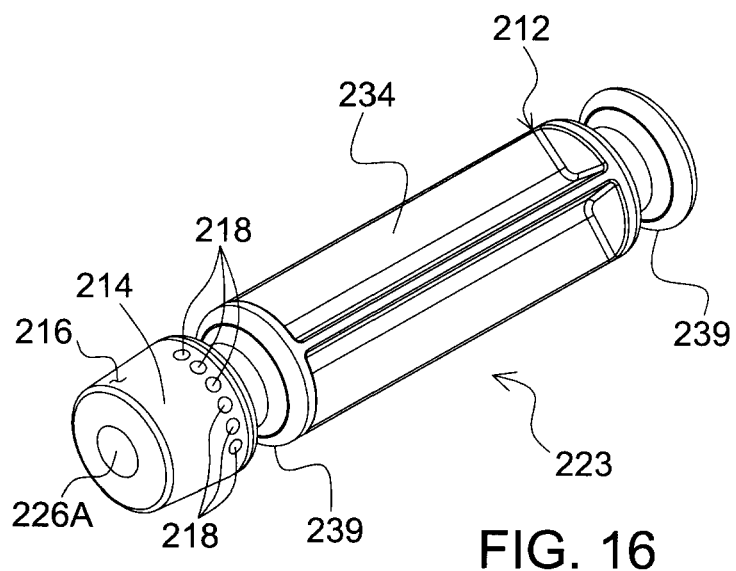
FIG. 16 is a perspective view of the angulary adjusting system shown in FIG. 13.
Figure 17:
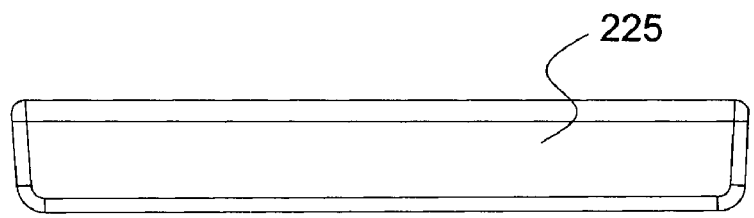
FIG. 17 is a top plan view of an elastomeric member designed to fit in a corresponding concavity of the angulary adjusting system shown in FIG. 13.
Figure 18:
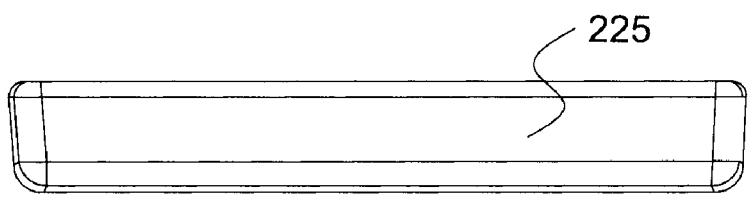
FIG. 18 is a front view of the elastomeric member of FIG. 17.
Figure 19:
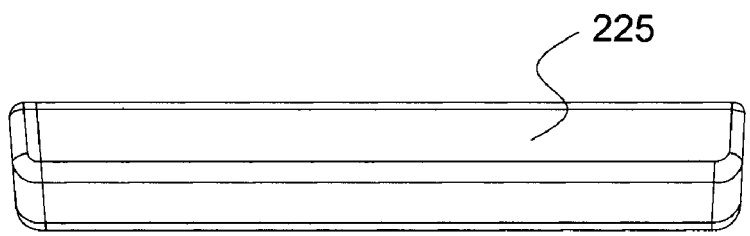
FIG. 19 is a front perspective view of the elastomeric member of FIG. 17.
Figure 20:
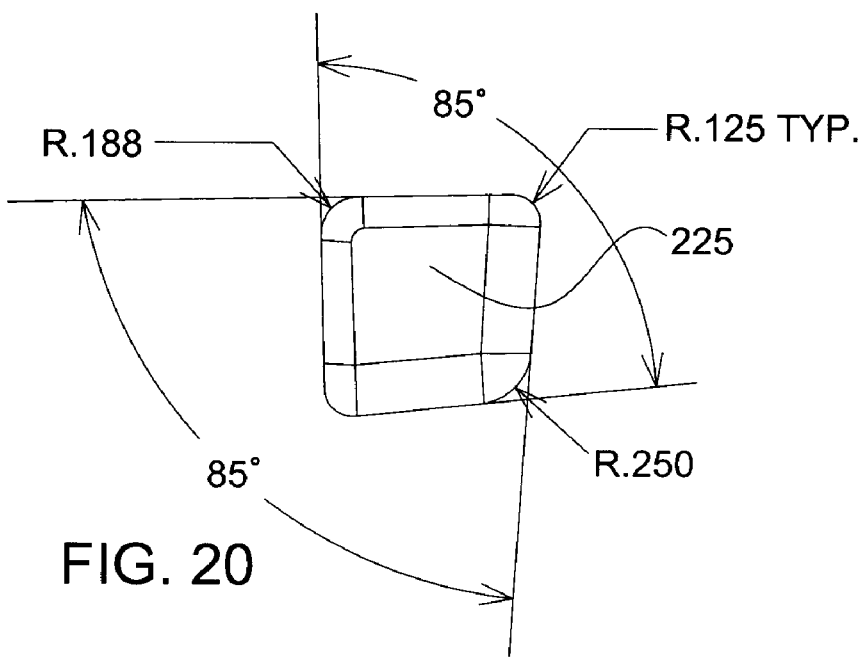
FIG. 20 is a end view of the elastomeric member of FIG. 17.

One contemplated solution to maintain the shaft 123 aligned within the housing 124 is the support blocks 126. Referring to FIG. 12, the support blocks 126 are used in pairs to define a circular opening by the alignment of semi-cylindrical cavities 140. Two pairs of the support blocks 126 are used to each accommodate one of the supported surfaces 131 of the shaft 123. In FIG. 12, a throughbore 141 is provided in the support block 126. The throughbore 141 is used with a fastener (e.g., bolt) or a rod, to maintain the support block in position within the housing 124. The flange 133 at the end of the shaft ensures that the shaft 123 remains in alignment within the housing 124. Although only the distal pair of support blocks 126 are provided with throughbores 141, it is considered to also lock the proximal pair of support blocks 126 with fasteners/rods. Support blocks 126 prevent shaft 123 to have translation movements within the housing 124, and allow the elastomeric material to be compressed only by the rotational movement of the shaft 123.

As the torsion system 120 is readily assembled without presses and such equipment, it is considered to sell the torsion system 120 separate from the elastomeric members 125. Therefore, elastomeric members 125 can be selected as a function of the shock absorption level desired. Moreover, elastomeric members 125 can be replaced when worn out, by simply removing the shaft 123 from the housing 124. As such, the torsion system can be sold in a kit, with additional or replacement elastomeric members 125 being available to the customer such that the shock absorption level of the torsion system 120 may be changed. The elastomeric members 125 are inserted in the torsion system 120 by positioning the elastomeric member 125 on the shaft 123. Whether or not the support blocks 126 are positioned on the shaft 123, the latter is manually inserted with the elastomeric member 125 in the housing 124. The support blocks 126 are locked to maintain the shaft 123 and elastomeric member 125 captive in the housing 124 of the torsion system 120. The steps are reversed to remove the shaft 123 from the housing 124, for instance to replace the elastomeric members 125.

Referring now to FIGS. 13 to 22, the Applicant has made substantial improvements to the aforesaid torsion system for torsion axle/suspension described in its International Patent Application no. PCT/CA2006/001901. More particularly, according to the eighth embodiment of the invention, the shaft 223 has a core portion 232 may have a cross-shaped section with four of said concavity 234, each of said concavity being defined by adjacent walls that forms an obtuse angle to each other. An example of such an obtuse angle may be +5 degree with respect to a normal angle between said adjacent walls. According to an optional and particularly preferred aspect, each intersection of adjacent walls may be rounded. Also, the shaft 223 has a connecting end 214 having an interface 216 provided with cavities 218, and it has a threaded bore 226A for receiving a screw.

More particularly, according to the eighth embodiment of the invention, the core portion 232 may have a cross-shaped section with four of said concavity 234, each of said concavity 234 being defined by adjacent walls that forms an obtuse angle to each other. An example of such an obtuse angle may be +5 degree with respect to a normal angle between said adjacent walls. According to an optional and particularly preferred aspect, each intersection of adjacent walls may be rounded.

According to a ninth embodiment of the invention, the elastomeric members 225 for each of the four concavities 234 are an elongated member of generally trapezoidal cross-section. Obtuse angle of this trapezoidal cross-section are selected to fit with corresponding adjacent walls of a corresponding concavity 234 of the core portion 232. According to an optional and particularly preferred aspect, each intersection of adjacent walls of the member may be rounded. More preferably, these elastomeric members 225 may be obtained according to techniques well known to persons skilled in the art such as, for example, by molding or extrusion. Also, chemical formulations of these elastomeric members 225 may be similar to those already known in the art.

According to the tenth embodiment of the invention, the shaft may have a pair of supported surfaces 231 at opposed ends of the core portion 232. More preferably, each of these supported surfaces 231 is adjacent to flanges 233 and forms a groove 239, the intersection of each of these supported surfaces with the flanges 233 being rounded.

According to the eleventh embodiment of the invention, the torsion system may further comprise support blocks 226 operatively supporting the supported surfaces 231 in the housing such that the shaft is rotatable about its longitudinal axis. More particularly, the support blocks 226 are paired at each said supported surface 231, each support block 226 having an opening 240 that is shaped to correspond with a corresponding portion of the groove 239 defines by the supported surfaces 231 and the flanges 233. The throughbore 241 illustrated in FIG. 22 is similar to the throughbore 141 illustrated in FIG. 12.

According to the twelfth embodiment of the invention, at least one of the pairs of support blocks 226 is secured to a housing (similar to the housing 124 of 15 FIG. 1), and the support blocks 226 maintain the shaft 223 captive within the housing. Those support blocks 226 can be made of any appropriate materials such as plastic, metal, etc., and manufactured according to techniques well known in the art.

According to the thirteenth embodiment of the invention, a method for inserting elastomeric members 225 in a torsion system, comprising the steps of: positioning at least one unused elastomeric member on a shaft 223 of a torsion system; manually inserting the shaft 223 and the at least one unused elastomeric member 225 in a housing of the torsion system; and locking support blocks 226 to maintain the shaft 223 and elastomeric member 225 captive in the housing of the torsion system.

According to the fourteenth embodiment of the invention, the insertion of elastomeric members 225 in the torsion system is preceded by the steps of: releasing the support blocks 226 from maintaining the shaft 223 and used elastomeric members 225 captive within the housing of the torsion system; manually removing the shaft 223 and the used elastomeric members 225 from the housing; and separating the shaft 223 from at least one of the used elastomeric members 225.

According to the fifteenth embodiment of the invention, the steps of removing and inserting elastomeric members 225 involved a used elastomeric member 225 and an unused elastomeric member 225 of different hardnesses. More particularly, the step of manually locking the shaft 223 also involves positioning the support blocks 226 on the shaft 223, and much more preferably, the step of locking the support blocks 226 involves passing at least one fastener transversely through at least a portion of the housing and at least a portion of at least one of the support blocks 226.

According to sixteenth embodiment of the invention, the step of positioning at least one unused elastomeric member 225 involves inserting the elastomeric member 225 in a concavity 234 of the shaft 223 of the torsion system.

Referring to FIG. 23, it is illustrated a schematic view of one of the possible alternative applications for suspension system according to the invention. More particularly, the suspension system is used in a tensioning device 301. This suspension system has a housing 324 mounted on a frame 300 and comprises a rotating element 302 mounted on a crank arm 320, and an angulary adjusting system as defined hereinbefore in any of the above-mentioned embodiments of the invention, for tensioning a belt 303 on rotating elements 305 and 307 (preferably pulleys) mounted on the frame 300. More preferably, the second and third aforesaid embodiments are particularly suitable for tensioning a wide belt. In such case, the crank arm is provided with a pair of rotating elements 302.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

I claim:

1. An angular adjusting mechanism for a suspension system comprising a shaft and a crank arm, the shaft having a connecting end connected to the crank arm, said angular adjusting mechanism comprising:
   a frusto-conical shaped surface provided on the connecting end and pointing outwardly from said shaft, said surface having an array of first cavities arranged circumferentially;
   a frusto-conical bore proximate a first extremity of said crank arm, said bore having an array of second cavities, said bore being operative to mate with said surface of said connecting end; and
   an interlocking element partly positioned in one of said second cavities and partly positioned in one of said first cavities so as to lock said crank arm at a predetermined angular position with respect to said shaft.

2. The angular adjusting mechanism of claim 1, wherein the connecting end further comprises a screw for connecting said crank arm to said connecting end.

3. The angular adjusting mechanism of claim 2, wherein said crank arm further comprises an axle proximate a second extremity of said crank arm, said axle being parallel to said shaft.

4. The angular adjusting mechanism of claim 1, wherein the interlocking element is tightly enclosed within a volume defined by one cavity of the first array of cavities and the cavity of the second array of cavities.

5. A torsion suspension system comprising:
   a shaft having two opposed connecting ends, each one of said connecting ends having a frusto-conical shaped interface surface pointing outwardly from said shaft, said interface surface having an array of first cavities arranged circumferentially;
   a pair of angular adjusting mechanisms, each one of said pair of angular adjusting mechanisms being located at a respective connecting end, each said angular adjusting mechanism having:
      a crank arm, said crank arm having a frusto-conical bore proximate a first extremity of said crank arm, said bore having a second cavity, said bore being operative to mate with said interface surface of said connecting end; and
      an interlocking element, said interlocking element being partly positioned in said second cavity and partly positioned in one cavity of said array of said first cavities so as to lock said crank arm at a predetermined angular position with respect to said shaft.

6. The torsion suspension system of claim 5, wherein each one of said connecting ends further comprises a screw for attaching said crank arm to said connecting end.

7. The torsion suspension system of claim 6, wherein said crank arm further comprises an axle proximate a second extremity of said crank arm, said axle being parallel to said shaft.

8. The torsion suspension system of claim 5, wherein the interlocking element is tightly enclosed within a volume defined by one cavity of the first array of cavities and the second cavity which is part of a second array of cavities.

9. A torsion suspension system comprising:
   a shaft having two opposed connecting ends;
   two crank arms operatively connected to a different one of said connecting ends;
   an angular adjusting mechanism at each of said connecting ends, said angular adjusting mechanism being operative to angularly adjust an angle of each of said two crank arms with respect to said shaft, said angular adjusting mechanism being as defined in claim 1.

10. The torsion suspension system of claim 9, wherein each one of said connecting ends further comprises a screw for attaching said crank arm to said connecting end.

11. The torsion suspension system of claim 9, wherein said crank arm further comprises an axle proximate a second extremity of said crank arm, said axle being parallel to said shaft.

12. The torsion suspension system of claim 9, wherein the interlocking element is tightly enclosed within a volume defined by one cavity of the first array of cavities and by one cavity of said second array of cavities.

13. A trailer for being hauled by a vehicle, the trailer comprising a body; and a torsion suspension system as defined in claim 5.

14. A strap or belt assembly, comprising a strap or a belt mounted on supporting rotationary members, and a tensioning device for tensioning said strap or belt on said rotationary members, said tensioning device comprising a torsion suspension system as defined in claim 5.

15. A torsion system comprising:
   a housing adapted to be secured to a structural portion of a vehicle;
   a shaft having a core portion accommodated in the housing and defining at least one concavity in the core portion, the shaft having a connecting end connected to a crank arm, the connecting end protruding out of the housing;
   at least one elastomeric member having a geometry so as to at least partially fill the concavity and contact an inner surface of the housing, the rotation of the crank arm resulting in a deformation of the elastomeric member; and
   an angular adjusting mechanism comprising:
      a frusto-conical shaped interface surface provided on the connecting end and pointing outwardly from said shaft, said interface surface having an array of first cavities arranged circumferentially;
      a frusto-conical bore proximate a first extremity of said crank arm, said bore having an array of second cavities, said bore being operative to mate with said interface surface of said connecting end; and
      an interlocking element partly positioned in one of said second cavities and partly positioned in one of said first cavities so as to lock said crank arm at a predetermined angular position with respect to said shaft.

16. The torsion suspension system of claim 15, wherein the core portion has a cross-shaped section with four of said concavities, each of said concavities being defined by adjacent walls that form an obtuse angle to each other.

17. The torsion suspension system of claim 16, wherein each intersection of adjacent walls may be rounded.

18. The torsion suspension system of claim 15, wherein the elastomeric members for each of the four concavities are an elongated member of generally trapezoidal cross-section having obtuse angle to fit with corresponding adjacent walls of a corresponding concavity of the core portion.

19. The torsion suspension system of claim 18, wherein each intersection of adjacent walls of the member may be rounded.

20. The torsion suspension system of claim 15, wherein the shaft has a pair of supported surfaces at opposed ends of the core portion, each of these supported surfaces being adjacent to flanges and forming a groove, the intersection of each of these supported surfaces with the flanges being rounded.

21. The torsion suspension system of claim 20, further comprising support blocks operatively supporting the supported surfaces in the housing such that the shaft is rotatable about its longitudinal axis, each support block having an opening that is shaped to correspond with a corresponding portion of the groove defined by the supported surfaces and the flanges and maintaining the shaft captive within the housing.

22. A torsion suspension system comprising:
a housing adapted to be secured to a structural portion of a vehicle;
a shaft having a core portion accommodated in the housing and defining at least one concavity in the core portion, the shaft having a connecting end connected to a crank arm, the connecting end protruding out of the housing;
at least one elastomeric member having a geometry so as to at least partially fill the concavity and contact an inner surface of the housing, the rotation of the crank arm resulting in a deformation of the elastomeric member; and
an angular adjusting mechanism provided at each end of the shaft, each angular adjusting mechanism comprising:
a frusto-conical shaped interface surface provided on the connecting end and pointing outwardly from said shaft, said interface surface having an array of first cavities arranged circumferentially;
a frusto-conical bore proximate a first extremity of said crank arm, said bore having an array of second cavities, said bore being operative to mate with said interface surface of said connecting end; and
an interlocking element partly positioned in one of said second cavities and partly positioned in one of said first cavities so as to lock said crank arm at a predetermined angular position with respect to said shaft.

23. The torsion suspension system of claim 22, wherein the core portion has a cross-shaped section with four of said concavities, each of said cavities being defined by adjacent walls that form an obtuse angle to each other.

24. The torsion suspension system of claim 23, wherein each intersection of adjacent walls is rounded.

25. The torsion suspension system of claim 22, wherein the elastomeric members for each of the four concavities are an elongated member of generally trapezoidal cross-section having an obtuse angle to fit with corresponding adjacent walls of a corresponding concavity of the core portion.

26. The torsion suspension system of claim 25, wherein each intersection of adjacent walls of the member is rounded.

27. The torsion suspension system of claim 22, wherein the shaft has a pair of supported surfaces at opposed ends of the core portion, each of these supported surfaces being adjacent to flanges and forming a groove, the intersection of each of these supported surfaces with the flanges being rounded.

28. The torsion suspension system of claim 27, further comprising support blocks operatively supporting the supported surfaces in the housing such that the shaft is rotatable about a longitudinal axis, each support block having an opening that is shaped to correspond with a corresponding portion of the groove defined by the supported surfaces and the flanges and maintaining the shaft captive within the housing.

* * * * *